United States Patent
Ferraro et al.

(10) Patent No.: US 6,497,040 B1
(45) Date of Patent: Dec. 24, 2002

(54) PROCESS FOR PRODUCING AN ANGLED BORE IN A COMPONENT

(75) Inventors: Giovanni Ferraro, Ludwigsburg (DE); Hansjoerg Egeler, Fellbach (DE); Andreas Wengert, Oppenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/403,925

(22) PCT Filed: Aug. 19, 1998

(86) PCT No.: PCT/DE98/02409

§ 371 (c)(1),
(2), (4) Date: Apr. 10, 2000

(87) PCT Pub. No.: WO99/43951

PCT Pub. Date: Sep. 2, 1999

(30) Foreign Application Priority Data

Feb. 28, 1998 (DE) ......................... 198 08 611

(51) Int. Cl.⁷ ................................. B21D 7/00
(52) U.S. Cl. .............. 29/890.128; 29/890.13; 29/557; 72/368; 239/533.2

(58) Field of Search .............. 29/557, 890.12, 29/890.128, 26 A, 34 R, DIG. 3, DIG. 85, 890.13; 72/368, 367.1, 341; 239/533.2, 533.3, 533.4, 533.9

(56) References Cited

U.S. PATENT DOCUMENTS

| | | | | |
|---|---|---|---|---|
| 4,490,898 A | * | 1/1985 | Wilson, II et al. | 29/402.13 |
| 4,577,481 A | * | 3/1986 | Staat | 72/368 |
| 4,838,068 A | * | 6/1989 | Carlin et al. | 72/367.1 |
| 5,813,107 A | * | 9/1998 | Chen | 29/557 |
| 6,044,543 A | * | 4/2000 | Dorth et al. | 29/558 |

FOREIGN PATENT DOCUMENTS

GB 2081152 A * 2/1982 ............. 72/368

* cited by examiner

Primary Examiner—David P. Bryant
Assistant Examiner—Jermie E. Cozart
(74) Attorney, Agent, or Firm—Ronald E. Greigg

(57) ABSTRACT

A process for producing an angled bore in a component, wherein a straight bore is first let into the component and, after the straight bore is let into the component, this component is deformed so that an angled bore course is produced.

3 Claims, 1 Drawing Sheet

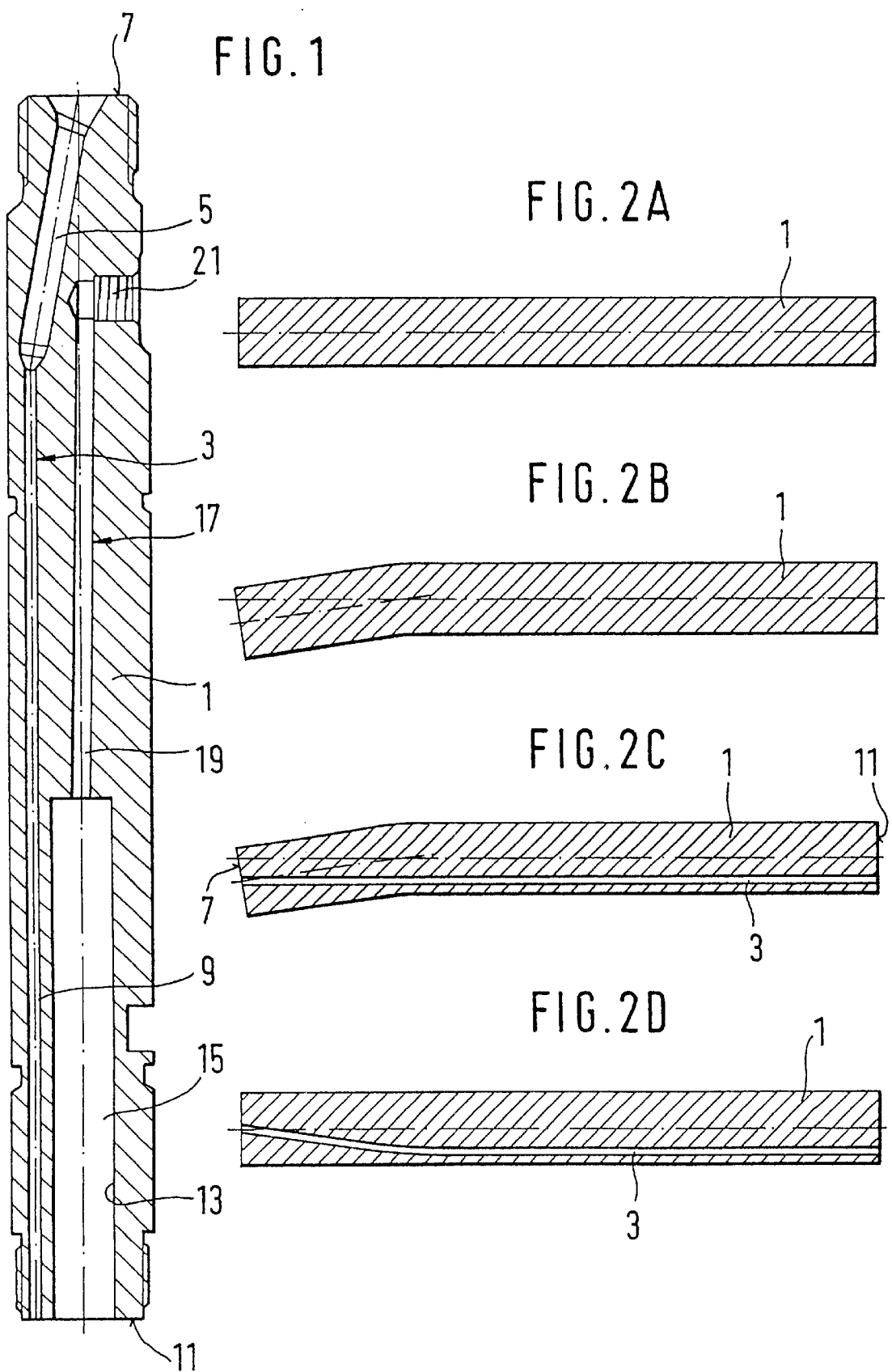

PROCESS FOR PRODUCING AN ANGLED BORE IN A COMPONENT

PRIOR ART

The invention is based on a process for producing an angled bore in a component. A process of this kind for producing an angled bore has been disclosed by the reference DE-OS 195 47 423 for producing the fuel supply conduit in a valve holding body of a fuel injection valve for internal combustion engine. The supply conduit in the valve body, which conduit is embodied there as an angled bore, is embodied by way of an oblique bore from a first end face of the valve holding body, which bore feeds into a longitudinal bore in the valve holding body that is eccentrically let in from the second end face. Thus, a sharp and indefinite intersection is produced at the transition between the two bores, wherein fatigue fractures are produced at this intersecting edge when there are high compression threshold loads of the fuel flowing through the inside of the supply conduit, particularly those above 1800 bar. Even modern manufacturing processes for grinding this bore transition between the oblique bore and the straight bore, e.g. with an abrasive grinding means, are insufficient to increase the compression threshold strength in this bore transition region so that it also suffices for very high loads of the kind that occur, for example, in modern internal combustion engines.

Furthermore, this kind of angled bores can currently be produced only at a high manufacturing cost.

ADVANTAGES OF THE INVENTION

The process according to the invention for producing an angled bore in a component has the advantage over the prior art that an angled bore can be produced inside a body in a manner that is simple for technical manufacturing reasons, wherein the transition between the oblique bore part and the straight bore part is embodied without an intersecting edge. On the one hand, this has the advantage that the flow behavior inside the angled bore can be improved and that in addition, the high-pressure tightness and thereby in particular the compression threshold strength at the transition between the oblique bore and the straight bore can be sharply increased in relation to the known manufacturing process. The manufacture of the angled bore thereby occurs in a simple manner by means of two essential process steps: in a first step, the bore is let into a component as a straight bore and in a second step, this component is deformed so that an angled bore course is produced. In this connection, the component, e.g. in its initial state before the production of the bore, can have an angled shape and after the boring process, is brought into a straight shape so that an angled bore is produced in a straight component.

Alternatively, this process can also be used in a component that is straight in its original state, e.g. a cylindrical component, wherein three main process steps are now required. In this connection, in a first main process step, the component is deformed out of its original shape, for example is bent. In another, second main process step, the bore, preferably a through bore, is let into the component wherein starting from a first end face, this bore can now be advantageously embodied as a bore that passes straight through axially. In a third main process step, the part of the component which was bent out of the original shape in the first process step is deformed back into the original shape, preferably bent back, so that the component now once more has essentially the same shape as it did before the production of the bore. This deformation is preferably produced by means of a bending process, wherein if need be, the component is thermally heated before the deformation. Slight shape deviations before and after the manufacturing process of the bore in the component can occur depending on the manufacture, but are so small that they remain within certain tolerances and are consequently negligible. The angled bore can thereby extend from one end face of the component to the opposite one, but it is alternatively also possible to provide the entry or exit opening of the bore on the radial circumference wall.

The manufacturing process of angled bores according to the invention is suitable for all components which preferably have an elongated shape, e.g. cylinders. The manufacturing process for angled bores according to the invention can be used in all areas of mechanical engineering, in particular fuel injection technology for internal combustion engines, and is described in the following exemplary embodiment of a valve holding body of a fuel injection valve for internal combustion engines in which very high loads occur in terms of the compression threshold strength. The angled bore in the exemplary embodiment is embodied as a through bore from a first end face to a second end face of the component, but alternatively, angled blind bores can also be produced by means of the manufacturing process according to the invention. Furthermore, the angled bore can be embodied as a diametrically uniform bore, but it is also possible to embody it as a stepped bore with different bore diameters, as described in the exemplary embodiment. To this end, after the production of the first bore with the smaller bore diameter, a second bore with a correspondingly larger bore diameter is advantageously produced, wherein the bore depth then determines the length of the larger diameter bore.

Other advantages and advantageous embodiments of the subject of the invention can be inferred from the description, the drawings, and the claims.

BRIEF DESCRIPTION OF THE DRAWING

An exemplary embodiment of the process according to the invention for producing an angled bore in a component is shown in the drawing and will be explained in detail in the subsequent description.

FIG. 1 shows a cylindrical component that is embodied as a valve holding body of a fuel injection valve for internal combustion engines and FIGS. 2A to 2D show a schematic representation of the individual process steps.

DESCRIPTION OF THE EXEMPLARY EMBODIMENT

In the exemplary embodiment described, the component with an angled bore shown in FIG. 1 is embodied as a valve holding body 1 of a fuel injection valve for internal combustion engines. The valve holding body 1 is embodied as a cylindrical component which is shaped so that its axial span is a multiple of its cross sectional area. The valve holding body 1 has an axial through conduit 3, which is embodied as an angled, stepped bore. This angled, stepped bore joins a top end face 7 of the valve holding body 1 with a larger diameter bore part 5, which extends obliquely in relation to the axis of the valve holding body 1. The entry opening of the upper, larger diameter bore part 5 of the through conduit 3 is disposed centrally in the top end face 7. The through conduit 3 is furthermore embodied by means of a smaller diameter bore part 9, which is embodied as axial in relation to the axis of the valve holding body 1, enters the valve holding body 1 at a bottom end face 11, and feeds with its upper end into the larger bore part 5. This smaller bore part 9 of the through conduit 3 is disposed eccentric to the axis of the valve holding body 1. From the bottom end face 11 of the valve holding body 1, another large diameter bore 13, which is embodied as a blind bore, leads into the valve holding body 1 and constitutes a spring chamber 15 for containing a valve spring, not shown, or an alternative restoring member of the fuel injection valve. This spring chamber 15 can be connected to a leakage line by means of a connecting conduit 17, which is comprised of an axial longitudinal bore 19 and a lateral bore 21 that intersect it.

The production of the through conduit 3 that is embodied as an angled bore in the valve holding body 1 will now be explained in conjunction with the schematic representations of FIGS. 2A to 2D.

In the exemplary embodiment described, the angled bore should be let into a preferably cylindrical component, for example a valve holding body 1, which is first supplied in the form of a blank as shown in FIG. 2A.

In a first process step schematically depicted in FIG. 2B, a part of this component 1 is first deformed, preferably bent, out of its original shape.

In another, second process step, the through bore 3 is let into the component 1 as an axial longitudinal bore, as shown in FIG. 2C. The entry of the bore 3 in the top end face 7 is disposed in the center and the exit of the bore 3 on the bottom end face 11 of the component 1 is disposed eccentric to its axis, wherein the entry and exit of the bore 3 can also be provided in reversed positions. Furthermore, it is now possible to let in the larger bore diameter 5 of the through bore 3 embodied as a stepped bore by virtue of the fact that a boring tool with a larger diameter is placed against the top end face 7 and is inserted into the valve holding body 1 to the desired depth.

In a third process step shown in FIG. 2D, the component 1 is now deformed back into its original shape, wherein the angled course of the bore 3 is now produced.

Consequently, with the process for producing an angled bore according to the invention, it is easily possible to produce this bore in a boring clamp and with a continuous bore course and to thus avoid the disadvantages of a bore intersection of an oblique bore and a straight bore. In addition to the above-described machining of a valve holding body 1 for a fuel injection valve, this manufacturing process can be used for all components with angled bores.

The foregoing relates to a preferred exemplary embodiments of the invention, it being understood that other variants and embodiments thereof are possible within the spirit and scope of the invention, the latter being defined by the appended claims.

What is claimed is:

1. A process for producing an angled bore (3) in a component (1), the process comprising:
   first, deforming the component from its original shape;
   second, providing a straight bore (3) in the component (1);
   third, deforming the component (1) back to its original shape so that an angled bore is produced.

2. The process according to claim 1, in which the first, deforming step is carried out by a bending process.

3. The process according to claim 1, in which the third, deforming step is carried out by a bending process.

* * * * *